United States Patent [19]

Wilnau

[11] Patent Number: 5,074,095

[45] Date of Patent: Dec. 24, 1991

[54] PRE-CAST CONCRETE PANEL AND JOIST ASSEMBLY AND METHOD OF CONSTRUCTION

[76] Inventor: Don Wilnau, 907 Hibernia Forest Dr., Green Cove Springs, Fla. 32043

[21] Appl. No.: 452,578

[22] Filed: Dec. 19, 1989

[51] Int. Cl.[5] ........................ E04G 21/14; B29C 53/02

[52] U.S. Cl. ........................................ 52/745; 264/261; 264/277; 264/336; 264/339

[58] Field of Search .................. 52/745, 630, 600, 602, 52/329, 330, 331, 333, 334, 335, 337, 338, 339, 744; 264/261, 275, 277, 334, 336, 339

[56] References Cited

U.S. PATENT DOCUMENTS 1,682,726 8/1928 Harloff .................................. 52/600

4,531,338 7/1985 Donatt .................................. 52/745

4,819,404 4/1989 Lafayette, Jr. ........................ 52/745

*Primary Examiner*—Michael Safavi

*Attorney, Agent, or Firm*—Thomas C. Saitta

[57] ABSTRACT

A method of constructing a cambered, pre-cast concrete panel and joist assembly comprising creating a mold on a backer surface, positioning reinforcing members, joist attachment plates and weld plates within the mold, pouring wet concrete into the mold, embedding anchor members in the concrete, letting the concrete harden, raising the ends of the concrete panel, attaching cambered joists to the panel and installing said assembly in a construction site. Both the concrete panel and the joists of the concrete panel and joist assembly are cambered. The joists are constructed with or without a top chord.

15 Claims, 3 Drawing Sheets

FIG. 3
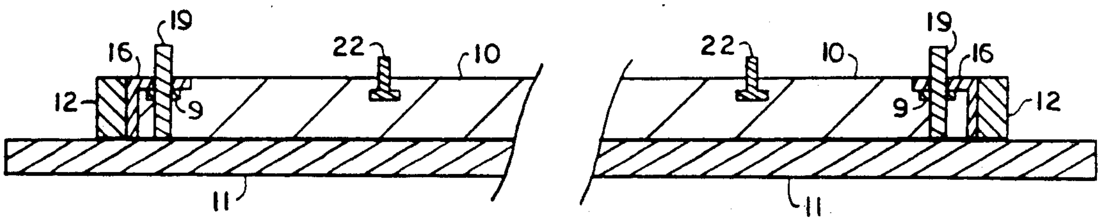
FIG. 4
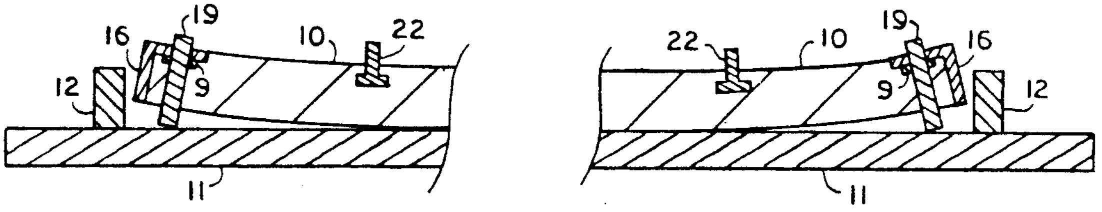
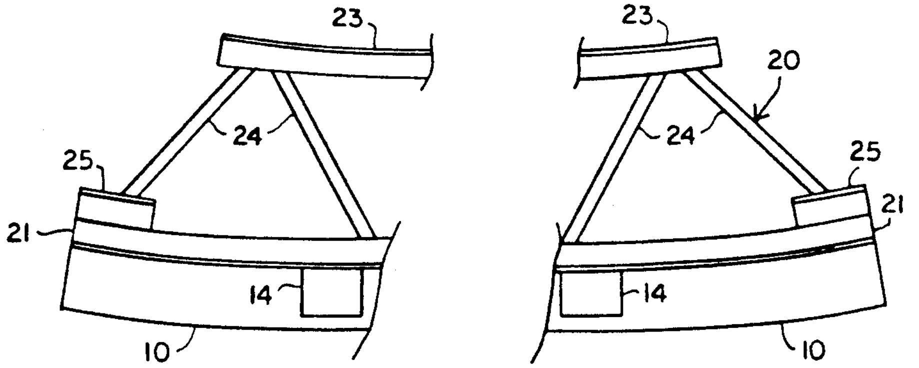
FIG. 5

FIG. 6
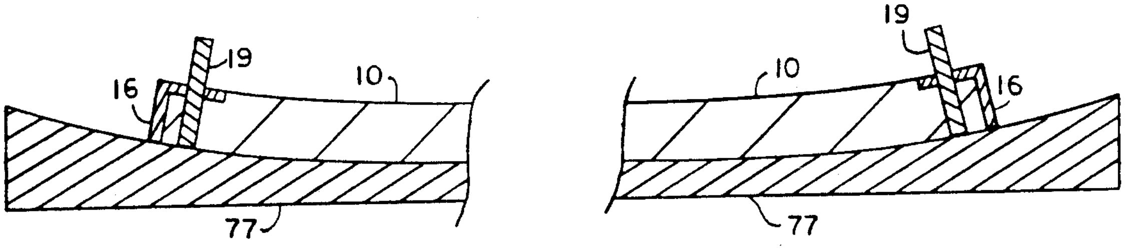
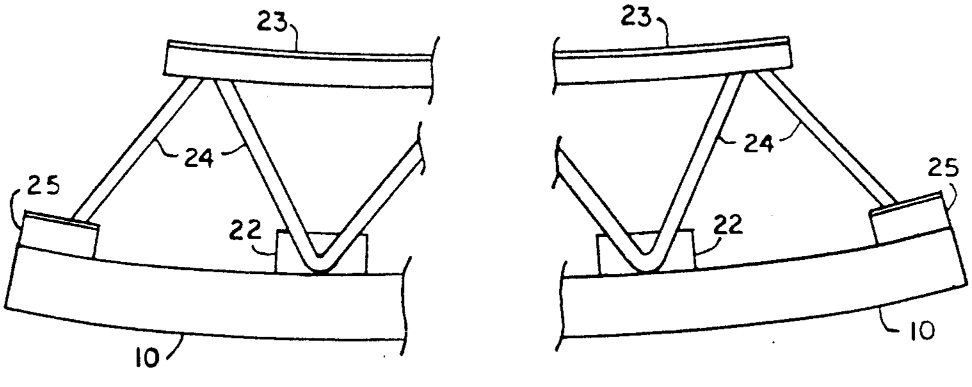
FIG. 7

PRE-CAST CONCRETE PANEL AND JOIST ASSEMBLY AND METHOD OF CONSTRUCTION

BACKGROUND OF THE INVENTION

The invention relates to the field of manufacturing pre-cast concrete panel and joist assemblies used in the construction industry, and more particularly to the field of fabricating such assemblies off site and subsequently transporting the completed assemblies to the construction site for use as load bearing members such as suspended floors or roofs, or of fabricating the assemblies on site where geographically possible. Specifically, the invention relates to the field of fabricating pre-cast concrete and joist assemblies where cambered joists are attached to the concrete panel after the panel has hardened, and to the resulting cambered concrete panel and joist assemblies themselves.

In traditional construction practice, suspended concrete floors in multi-story buildings are formed in place by positioning and bracing the joists to support the floor slab, setting out corrugated decking to receive the wet concrete, placing wire mesh or similar reinforcing materials above the decking, installing edge members to contain the wet concrete, pouring the wet concrete by bucket or pump, allowing the concrete to harden, and removing the extraneous members. Each floor must be fully completed and set up prior to performing any further construction. This method requires specific crews to perform the work, creates situations where mistakes may result in unacceptable and dangerous floor members, and slows construction since the concrete must be allowed to set up over a period of several days.

To alleviate some of these problems, methods have been developed for pre-fabricating the concrete slab and joist assembly. A number of pre-cast concrete panel and joist assemblies can be made and transported to the construction site, ready for installation at the first opportunity. Since the assemblies are pre-cast, construction is not delayed to wait for the setting of the poured concrete. The assemblies are modular in the sense that a number of assemblies are placed in position by crane and then joined together to form a continuous floor assembly.

For example, Cahill in U.S. Pat. No. 973,165 shows a pre-cast concrete slab construction consisting of a reinforced slab formed with concrete ribs on the underside to lighten the weight of the completed slab. The concrete ribs act as modern joist assemblies to handle the compressive load. Longpre et al. in U.S. Pat. No. 4,495,688 teach a method of forming pre-cast concrete panels having joists embedded into the concrete slab. A mold is formed, the concrete is poured in, and pre-constructed joist assemblies are set into the wet concrete to a depth whereby the top chord of the joist is contained within the concrete. It is also known to manufacture joist assemblies such that portions of the webbing material extend beyond the top chord, and this extended webbing is then embedded into the wet concrete, as shown in U.S. Pat. No. 2,558,946 to Fromson.

The method of the invention is distinct and novel from the prior methods since the cambered joist assembly is attached to a flat concrete slab after the slab has hardened. This eliminates having to accurately position the joist member in the wet concrete, thus removing steps from the process, simplifying the level of skill required by the process, and cutting costs and time of manufacture. The method of the invention requires no specially constructed joist assemblies, as standard cambered joists well known in the industry can be used in the process. The method allows cambered joists to be used to produce a cambered slab and joist assembly, without requiring special processing techniques to alter the surface of the hardened concrete slab. The method provides a finished concrete panel and joist assembly having a predetermined amount of camber in both the concrete panel and the joists, even though the slab is initially formed on a flat backer, so that when said assembly is installed the weight of the slab itself and the imposed load removes a portion of the camber, resulting in a positive camber surface on the concrete panel close to planar.

SUMMARY OF THE INVENTION

The method of the invention involves initially setting up a form to receive the concrete. The form is created by placing four side members in a rectangular shape on a flat, smooth surface capable of supporting the weight of the concrete. The surface is coated with a release material to prevent adhesion of the poured concrete. Reinforcing members, such as rebar or welded wire mesh, is positioned in the central portion of the mold and weld plates are placed in the interior of the mold at points along the long side form members. Metal joist attachment plates having raising members are positioned at each end so that the surface of the plates will be flush with the upper surface of the poured concrete. The concrete is poured and joist anchor members for attaching the joists are set into the wet concrete. The concrete is allowed to completely harden. The hardened panel is then raised up at each end sufficient distance to create a camber in the concrete panel. Alternatively, the raising members can be used to remove the hardened panel from the mold and place it in a pre-made cambered bed or rack to impart the camber in the concrete panel. Joists having a pre-set camber, the amount of which is determined by the length and weight of the finished assembly and imposed loads, are then attached to the concrete panel by welding the top chords to the metal joist attachment plates and attaching each of the joist anchor members. The assemblies are then removed from the molds by crane, inverted, transported to the construction site, and set into place. Individual panels are joined by welding the adjacent weld plates together and then filling in the channel between the panels with additional concrete. The concrete panel and joist assembly has a cambered concrete panel as well as cambered joists.

In an alternative embodiment, the joists are manufactured without a top chord, and the joist anchor members are attached directly to the joist webbing. Because the assembly is inverted in use, the concrete slab is in compression and the top chord is not necessary for structural stability and strength. By eliminating the top chord, significant cost savings are incurred and the overall depth of the assembly is reduced.

BRIEF DESCRIPTION OF THE DRAWINGS

FIG. 3 is a cross-sectional view, taken along line III—III of FIG. 1, showing the concrete panel, the joist seat attachment plates and anchor bolts.

FIG. 4 is a cross-sectional view similar to FIG. 3 showing the concrete panel with both ends raised to meet the camber of the joist, as seen prior to wedging. The amount of camber is exaggerated for illustration purposes.

FIG. 5 is a side view of a completed assembly, showing the joist member attached to the concrete panel, again with exaggerated camber illustration purposes.

FIG. 6 is a sectional view showing the use of a camber rack to impart the necessary camber in the hardened concrete panel.

FIG. 7 is a side view of the completed assembly where a joist not having a top chord is used.

DETAILED DESCRIPTION OF THE INVENTION

The method of constructing the pre-cast concrete panel and joist assembly comprises initially setting up a mold in which to cast the panel. The assemblies can be cast at a manufacturing site and then shipped to various installation sites, or the molds can be built at the installation location itself, if the site provides suitable geography and space.

Figure 1:
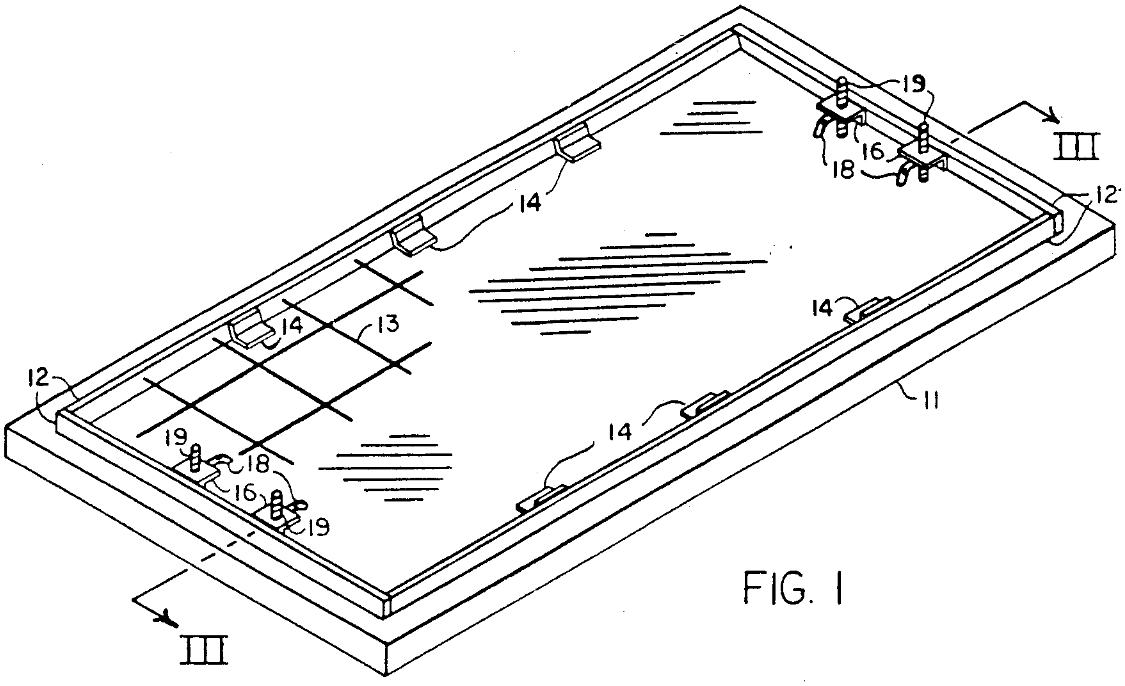
FIG. 1 is a perspective view of the mold as seen prior to the introduction of the wet concrete, showing the four form members, the reinforcement members, the weld plates and the joist seat attachment plates.

Typically, a smooth, planar concrete slab or steel table 11 is used as the backer surface and a four sided form, usually rectangular, is placed on this surface to form the perimeter of the panel, as shown in FIG. 1. The form members 12 can be of wood or metal and are preferably bevelled or angled on the interior side of at least two of the form members 12, such that the interior dimensions of the mold increase from the bottom of the mold to the top of the mold. This bevelling of the form members 12 allows for easier removal of the concrete panel 10 when it has hardened and also shapes the panel 10 such that a V-shaped channel is created when two such panels 10 are inverted and set adjacent each other to form a floor or roof member. This V-shaped channel allows the two panels 10 to be welded together with imbedded steel plates and then acts as a trough to receive cement or grout for the final joining process, resulting in an integral floor slab.

After the form members 12 are set in place, the bottom of the mold is coated with a mold release, such as form oil or bond breaker, to insure that the wet concrete will not bond to the slab or table surface 11.

Reinforcement members 13, of any type generally known in the art, are then positioned within the mold so that the reinforcement members 13 will be contained within the concrete panel 10 upon completion. For example, rebar, welded wire mesh or pre-stressed tendons may be used to provide additional strength within the finished concrete panel 10. Also at this time, steel weld plates 14 may be positioned adjacent the bevelled side of the form members 12. The weld plates 14 can be formed of short segments of angle iron with an anchoring member or members 15 extending into the interior of the mold such that this anchoring member 15 will be embedded in the interior of the finished concrete panel 10 to hold the weld plates 14 in place. The exterior surface of these weld plates 14 will be flush with the bevelled edge of the finished concrete panel 10 and are positioned so that the weld plates 14 of one panel 10 will abut the weld plates 14 of an adjacent panel 10 when the two finished panels 10 are set in place in the building. The weld plates 14 will then be welded together to anchor the two panels 10.

Figure 2:
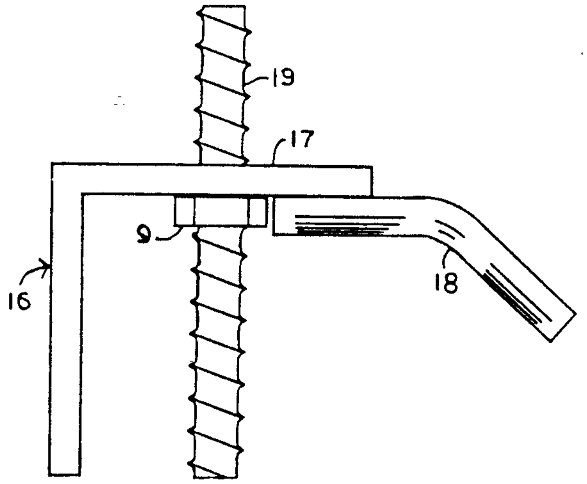
FIG. 2 is a side view of a joist seat attachment plate.

Joist seat attachment plates 16, as shown in FIG. 2, are set into the mold at interior positions on opposites sides of the form members 12 where the ends of the joists are to be attached to the panel 10. These seat attachments 16 are steel plates formed of short segments of angle iron to which the top chord 21 of the joist 20 is welded. The seat attachment plate 16 consists of a steel plate 17 positioned to be flush with the surface of the concrete poured into the mold and anchor member or members 18 extending into the interior of the mold which will be embedded in the interior of the concrete panel 10. For example, for a three inch panel 10, the seat attachment plate 16 will be positioned so that the upper surface of plate 17 is three inches above the mold bottom. A raising member, preferably a threaded bolt or rod 19, is inserted into an aperture cut into plate 17 of the seat attachment plate 16 so that the bolt 19 extends vertically through the plate 17 to the bottom of the mold. A nut 9 is threaded onto bolt 19 to abut the underside of plate 17. These bolts 19 will be used to raise the ends of the hardened concrete panel 10 for attachment to the cambered joist members 20. Additionally, bolts 19 will be used at the installation site as means to attach a lifting eye for raising the completed assembly.

Wet concrete is now added to fill the mold to the desired level, typically three to six inches in depth. The wet concrete surrounds the reinforcement members 13 and the anchor members 15 and 18 of the weld plates 14 and seat attachment plates 16. The outer surfaces of the concrete will be flush with the outer surfaces of the weld plates 14 and seat attachment plates 16 when hardened.

Before the concrete sets, joist anchor members 22, preferably anchor bolts of a type known in the art, are inserted into the concrete at intervals on lines running between opposite joist seat attachment plates 16, as shown in FIG. 3. These joist anchor members 22 will be used to attach the top chord 21 of the joist member 20 to the finished concrete panel 10. Alternatively, the joist anchor members can be weld plates set into the wet concrete. Another alternative for attaching the joist members 20 is to allow the panel 10 to harden and then drill holes for implantation of wedge or sleeve anchors.

After the concrete 10 panel has hardened, usually a period of roughly 24 hours, the joists 20 are attached to the panel 10. As seen in FIG. 5, the joists 20 are of the standard construction, having a continuous top chord 21 and a continuous bottom chord 23 made of angle iron connected by webbing material 24 alternating between the two chords 21 and 23. The top chord 21 is longer than the bottom chord 23 and short sections of angle iron are attached to the top chord 21 and webbing 24 at each end to form the joist seats 25, which rest on the wall or other support member when the joist and panel assembly are inverted and put in place at installation. Since the panel and joist assembly must have sufficient load bearing strength, the joists 20 are cambered in manufacture, such that there is a deviation from true linear of from one quarter inch to one and one half inch over top chord lengths from 20 feet to 60 feet, respectively. Upon installation the weight of the concrete panel and the imposed loads remove a portion of the camber, resulting in a slightly positive camber surface.

The joists 20 are attached by inverting them each so that the top chord 21 rests on the surface of the hardened concrete panel 10 and extends from one seat attachment plate 16 to its opposite seat attachment plate 16, following the line of the embedded joist anchor members 22. Since the exposed surface of the concrete panel 10 in the mold is in use the bottom surface, the camber of the top chord 21 creates a situation where the middle portion of the chord 21 will directly contact the concrete surface, but the two ends of the chord 21 will be slightly raised from the surface. To adjust for this, the threaded bolts 19 running through the seat attachment plates 16 and the concrete panel 10 are turned so that the ends of the bolts 19 extend beneath the concrete panel 10, thus forcing upward the ends of the concrete panel 10, as seen in FIG. 4. The panel 10 is then wedged in this position and the bolts 19 are completely removed from the attachment plates 16. The joist 20 is then set into position and permanently attached to the concrete panel 10 by attaching the joist anchor members 22 positioned at intervals along the top chord 21 and welding the top chord 19 to the attachment plates 16 at each end. The remaining joists 20 are then likewise attached.

As an alternative to raising the ends of the concrete panel 10 by turning bolts 19, the necessary camber can be produced in the slab 10 by raising the panel 10 out of the mold and placing it in a pre-constructed camber bed or rack 77, as shown in FIG. 6. The surface of the camber rack 77 can be of hardened concrete, metal panels or metal beams, so long as the surface has the correct camber and is sufficiently strong to withstand the weight of the panel 10 without deflection. Lifting lines are attached to bolts 19 to perform this task. The camber rack 77 can be built of sufficient length to accommodate any length panel 10, since the amount of camber is in direct relation to the length of the panel 10. As long as the panel 10 is set in the center of the camber rack 77, the proper amount of deflection will be imparted. The joists 20 are now attached as outlined before.

The concrete panel and joist assembly is then lifted by crane from the mold, inverted, transported to the installation site, and set into place. Each assembly is identical and a number of assemblies can be stacked for transport or storage. Because the camber was designed into the joists 20 prior to assembly and the concrete panel 10 was deviated to conform to this camber, the finished assembly has a built in camber for both concrete and joist. The camber amount is determined by the joist 20 length and concrete panel 10 depth such that when inverted and set in place, the weight of the assembly will cancel out a portion of the camber, resulting in a nearly level surface of positive camber. The joist seats 25 are set onto the support members in the building under construction. Adjacent assemblies are joined at the weld plates 14 and the channel is filled with appropriate material to form a continuous floor or roof member. Since the assemblies are pre-cast, no time is lost waiting for the concrete to set and no extraneous forms or support members need be removed at the site.

In an alternative embodiment, joists 20 are prepared without a top chord 21, as shown in FIG. 7. Since the concrete panel and joist assembly will be inverted in use, the top chord 21, which is in compression in use, can be omitted. The concrete panel 10 itself will be in compression since it is cambered, so that the structural and strength requirements for construction can be met without the necessity of including a top chord 21. The joist anchor members 22 in this embodiment are weld plates embedded into the concrete panel 10 before it has hardened, the joist anchor members 22 presenting a vertical surface extending above the surface of the panel 10 to which the extended ends of joist webbing 24 are welded after the panel 10 has hardened and had the camber imposed, thus directly connecting the panel 10 to the joist 20. The joist seats 25 are positioned on the webbing 24 so that they can be directly attached to the joist seat attachment plates 16. By eliminating the top chord 21, significant cost savings are obtained, as well as reducing the overall depth of the concrete panel and joist assembly.

The above illustrations are by way of example only and it will be obvious to one skilled in the art that substitutions and equivalents exist. The true scope and definition of the invention therefore is to be as set forth in the following claims.

I claim:

1. A method of manufacturing a cambered concrete panel and joist assembly, comprising the steps of:

(A) providing a four sided form on a backer surface;
(B) positioning joist attachment means at opposite ends of the interior of said form;
(C) pouring wet concrete into said form;
(D) allowing said concrete to harden to form a concrete panel having a flat surface;
(E) providing one or more cambered joists;
(F) raising the ends of said concrete panel containing said joist attachment means;
(G) inverting and attaching said joists to said joist attachment means;
(H) removing said concrete panel and joist assembly from said form.

2. The method of claim 1, where said joist attachment means comprise a raising member, and the step of raising the ends of said hardened concrete panel is performed by manipulating said raising member.

3. The method of claim 2, where said raising member comprises a threaded rod, and the step of raising the ends of said hardened concrete panel is performed by turning said threaded rod so that it extends below the surface of said concrete panel.

4. The method of claim 3, further comprising the steps of wedging the raised ends of said hardened concrete panel, and then removing said threaded rods from said joist attachment means.

5. The method of claim 1, further comprising the steps of implanting anchor members in the surface of the wet concrete, and attaching said cambered joists to said anchor members after inverting said joists.

6. The method of claim 1, where said four sided form has at least two bevelled sides.

7. The method of claim 6, further comprising the step of positioning weld plates on said bevelled sides of said form prior to the pouring of the wet concrete.

8. The method of claim 1, further comprising the step of positioning reinforcement members in the interior of said form prior to the step of pouring the wet concrete.

9. The method of claim 1, further comprising the step of applying mold release means to said backer surface prior to the step of pouring the wet concrete.

10. The method of claim 6, further comprising the steps of inverting said concrete panel and joist assembly after said removing step, transporting said concrete panel and joist assembly to the installation site, installing said concrete panel and joist assembly, and pouring wet concrete along the bevelled sides of said concrete panel.

11. The method of claim 7, further comprising the steps of inverting said concrete panel and joist assembly after said removing step, transporting said concrete panel and joist assembly to the installation site, installing said concrete panel and joist assembly, welding together adjacent weld plates, and pouring wet concrete along the bevelled sides of said concrete panel.

12. The method of claim 1, where the step of raising the ends of said hardened concrete panel is performed by providing a camber rack having a cambered surface to receive said concrete panel, removing said panel from said form and placing said panel in said camber rack.

13. The method of claim 5, where said joists have a bottom chord and webbing, but no top chord, and said anchor members are attached directly to said webbing.

14. A method of manufacturing a cambered concrete panel and joist assembly, comprising the steps of:

(A) providing a four sided form having at least two bevelled sides on a backer surface;

(B) positioning reinforcing members within said form;

(C) positioning pairs of joist attachment means, each comprising a raising member, at opposite ends of the interior of said form;

(D) positioning weld plates adjacent said bevelled sides of said form;

(E) pouring wet concrete into said form;

(F) embedding anchor members in the surface of said wet concrete between said pairs of joist attachment means;

(G) allowing said wet concrete to harden to form a concrete panel;

(H) providing one or more cambered joists;

(I) raising the ends of said concrete panel to match the surface of said cambered joists by manipulating said raising members;

(J) wedging said ends of said concrete panel and removing said raising members;

(K) attaching said cambered joists to said joist attachment means and said embedded anchor members;

(L) removing said concrete panel and joist assembly from said form.

15. The method of claim 14, further comprising the steps of:

(M) inverting said concrete panel and joist assembly;

(N) installing said concrete panel and joist assembly;

(O) welding adjacent weld plates;

(P) pouring wet concrete into the bevelled sides of said concrete panel.

* * * * *